US012027035B2

(12) United States Patent
Ten Kate

(10) Patent No.: US 12,027,035 B2
(45) Date of Patent: Jul. 2, 2024

(54) PERSONALIZED FALL DETECTOR

(71) Applicant: Lifeline Systems Company, Framingham, MA (US)

(72) Inventor: Warner Rudolph Theophile Ten Kate, Waalre (NL)

(*) Notice: Subject to any disclaimer, the term of this patent is extended or adjusted under 35 U.S.C. 154(b) by 463 days.

(21) Appl. No.: 16/953,487

(22) Filed: Nov. 20, 2020

(65) Prior Publication Data
US 2021/0166554 A1    Jun. 3, 2021

(30) Foreign Application Priority Data

Nov. 29, 2019 (EP) .................................. 19212671

(51) Int. Cl.
  G08B 29/18   (2006.01)
  G01P 13/00   (2006.01)
  G08B 21/04   (2006.01)

(52) U.S. Cl.
  CPC ............ G08B 29/185 (2013.01); G01P 13/00 (2013.01); G08B 21/0446 (2013.01)

(58) Field of Classification Search
  CPC ............... G08B 29/185; G08B 21/043; G08B 21/0446; G08B 29/26; G01P 13/00
  See application file for complete search history.

(56) References Cited

U.S. PATENT DOCUMENTS

| | | | | |
|---|---|---|---|---|
| 10,980,491 B1* | 4/2021 | Jones | ................... | A61B 5/7275 |
| 2006/0214806 A1* | 9/2006 | Clifford | ................. | A61B 5/002 |
| | | | | 340/573.1 |
| 2009/0224925 A1* | 9/2009 | Gannot | .............. | G08B 21/0446 |
| | | | | 340/573.1 |
| 2012/0106782 A1* | 5/2012 | Nathan | ................... | G08B 17/12 |
| | | | | 340/541 |
| 2013/0138395 A1* | 5/2013 | Baggen | ................ | G08B 21/043 |
| | | | | 702/181 |

(Continued)

FOREIGN PATENT DOCUMENTS

| | | |
|---|---|---|
| CN | 106407996 A | 2/2017 |
| CN | 109166275 A | 1/2019 |

(Continued)

OTHER PUBLICATIONS

Zhang, T. et al., "Fall Detection by Wearable Sensor and One-Class SVM Algorithm", ICIC 2006, LNCIS 345, pp. 858-863, 2006.

(Continued)

*Primary Examiner* — Rufus C Point
(74) *Attorney, Agent, or Firm* — Honigman LLP

(57) ABSTRACT

A method and system for training a fall detection classifier using subject-specific movement data. Movement data responsive to a subject's movements during everyday activities are obtained over a predetermined data collection period. For each detected event in the movement data, values for one or more parameters that may (together or individually) indicate a fall are obtained. The obtained values are used to generate a subject-specific probability distribution for non-fall events. A fall event probability distribution is obtained using the non-fall event probability distribution. This fall event probability distribution can then be subsequently processed, with reference to a threshold value, to distinguish fall events from non-fall events.

15 Claims, 4 Drawing Sheets

(56) References Cited

U.S. PATENT DOCUMENTS

2018/0174420 A1\* 6/2018 Clark .................... G08B 25/10
2018/0336773 A1\* 11/2018 Hanson .................. G06T 7/194
2019/0175074 A1 6/2019 Zhang et al.

FOREIGN PATENT DOCUMENTS

DE 102008049194 A1 4/2010
WO 2009090584 A2 7/2009

OTHER PUBLICATIONS

Yu, M. et al., "Fall Detection for the Elderly in a Smart Room by Using an Enhanced One Class Support Vector Machine", 2011, Advanced Signal Processing Group, Electronic and Electrical Engineering Department, Loughborough University, Loughborough, Leicester, UK.

Pierleoni, P. et al., "A High Reliability Wearable Device for Elderly Fall Detection", IEEE Sensors Journal, vol. 15, No. 8, Aug. 2015.

International Search Report and Written Opinion, International Application No. PCT/EP2020/083660, dated Mar. 4, 2021.

Yu, M. et al., "Fall Detection for the Elderly in a Smart Room by Using an Enhanced One Class Support Vector Machine", 2011, Advanced Signal Processing Group.

Zhang, T. et al., "Fall Detection by Wearable Sensor and One-Class SVM Algorithm", LNCIS 345, pp. 858-863, 2006.

International Preliminary Report on Patentability, relating to Applicaiton No. PCT/EP2020/083679, dated Jun. 9, 2022.

International Preliminary Report on Patentability, relating to Applicaiton No. PCT/EP2020/083660, dated Jun. 9, 2022.

\* cited by examiner

PERSONALIZED FALL DETECTOR

CROSS-REFERENCE TO PRIOR APPLICATIONS

This application claims the benefit of European Patent Application No. 19212671.2, filed on 29 Nov. 2019. This application is hereby incorporated by reference herein

FIELD OF THE INVENTION

The invention relates to the field of fall detection in Personal Emergency Response Systems.

BACKGROUND OF THE INVENTION

Personal Emergency Response Systems (PERS) enable elderly and disabled people to live independently by summoning immediate help when an adverse event, such as a fall, occurs. The use of such systems allows people who would otherwise require round-the-clock care to live in their own homes, and reduces their care costs.

Some PERS systems rely on subject input, such as a button, to raise an alarm when assistance is required, but this means that a subject is unable to access immediate medical help in the case of the subject's becoming unconscious as a result of a fall, when such help is most critical. There is also a risk that the subject may fall in such a way that, while remaining conscious, he/she is unable to activate the alarm.

For these reasons, automatic fall detectors have been developed that can summon help without needing subject input. These detectors generally come in the form of wearable devices that contain sensors to monitor subjects' movements and processors that decide whether a detected movement is the result of a fall. These devices are often located around the neck, at the waist or around the wrist, but other locations are also conceivable, including such locations as ears (for example, in hearing aids). Wrist-located devices are becoming increasingly popular as smartwatches, on which fall detection apps may be installed, become more widely used.

Current automatic fall detectors are not able to distinguish with complete accuracy between falls and movements that occur during everyday activities. Fall detection accuracy is particularly low in wrist-located devices.

In order to avoid failing to detect genuine falls, fall detectors are configured to have a sufficiently high false alarm rate (the rate of non-fall events classified as fall events) to minimize the number of falls that are not detected as such. A high false alarm rate necessitates the use of a cancel function to avoid summoning help needlessly; subjects can activate this function when the fall detector incorrectly detects a fall. However, some subjects may find the cancel function difficult to use, become panicked when a false alarm occurs and forget to activate the cancel function, or accidentally activate the cancel function when a genuine fall has occurred.

There is therefore a need for a fall detector with improved accuracy, such that false alarms are unlikely enough that a cancel function is not required.

SUMMARY OF THE INVENTION

The invention is defined by the claims.

According to examples in accordance with an aspect of the invention, there is provided a computer-based method of training a classifier to distinguish between a fall event and a non-fall event of a subject.

The method comprises: obtaining movement data responsive to the subject's movement during everyday activities over a predetermined data collection period; detecting one or more events in the movement data; obtaining a value for each of a one or more parameters from the movement data at the time of the event for each event that occurs during the predetermined data collection period; generating a non-fall event probability distribution by calculating a probability distribution for a combination of the one or more parameters using the obtained values for each of the one or more parameters, wherein the combination of the one or more parameters is capable of indicating the probability of a fall; obtaining a fall event probability distribution using the non-fall event probability distribution; and obtaining a threshold value for the fall event probability distribution that distinguishes between a fall event and a non-fall event.

This method uses a subject-specific probability distribution that an event is not a fall in order to distinguish between a fall and a non-fall event with greater accuracy than methods that use a probability distribution that an event is (not a) fall based on a population average, as different subjects will exhibit different typical movement behaviors.

The subject's movements are detected during everyday activities over an initial data collection period; events are recorded based on the movement data, and one or more values for parameters that could affect the probability that an event is a fall, such as height change and orientation, are computed. Once the initial data collection period is completed, for example by a time interval having been passed or by a minimum number of events being collected, these values are used to determine a subject-specific probability distribution for non-fall events.

The subject-specific probability distribution for non-fall events is used to obtain or derive a fall event probability distribution.

In subsequent processing for detection of a fall event, a calculated fall event probability for the combination of one or more values (for the one or more parameters) for a detected event can be compared with a threshold value in order to decide whether the detected event is a fall or a non-fall event.

Events may be detected by setting at least one of the one or more parameters as a trigger parameter and defining an event as occurring at a time at which a value of the at least one trigger parameter exceeds or falls below a corresponding predetermined trigger threshold value. Other methods of detecting an event will be apparent to the skilled person, e.g. by processing a chunk of movement data using a machine-learning method.

The proposed embodiments enable a fall detector to be personalized to the movement of a subject, i.e. to better distinguish between a fall and a non-fall of the subject. In particular, a fall detection probability distribution (that is used to distinguish between a fall and a non-fall) is personalized to a user. This reduces the likelihood of false alarms being generated when a subject has not actually fallen.

In some embodiments, the one or more parameters comprises a plurality of parameters, so that the combination of one or more parameters comprises a combination of a plurality of parameters.

In some embodiments, the calculated probability distribution for the combination of the one or more parameters is calculated by determining a probability distribution for each of the one or more parameters, and defining the calculated probability distribution for the combination of the one or more parameters as the product of the determined probability distributions. Put another way, the logarithm of the probability distribution (in an arbitrary base) for the combination of the one or more parameters is computed as the sum of the logarithms of the determined individual probability distributions (in the same base).

The step of obtaining a fall event probability distribution using the non-fall event probability distribution may comprise calculating the fall event probability distribution using the non-fall event probability distribution. The step of processing the non-fall probability distribution to obtain the fall event probability distribution may comprise processing the non-fall event probability distribution such that there is a high fall event probability for values at which the non-fall event probability is low and vice versa. For example, the fall event probability distribution may be the inverse or compliment of the non-fall event probability distribution.

In another example, the step of obtaining the fall event probability distribution may comprise dividing a predetermined estimation of the fall event probability distribution by the non-fall event probability distribution. The quotient may be normalized to derive a fall event probability distribution, or may by itself effectively form a fall event probability distribution.

Thus, a probability distribution for fall events is generated by using the idea that events that are likely to be non-fall events are unlikely to be fall events. This avoids the need for directly obtaining reliable fall data of a user, which are difficult and time-consuming to obtain.

In some embodiments, the step of obtaining the fall event probability distribution comprises processing only part of the non-fall event probability distribution, which part of the non-fall probability distribution to be processed being determined using a predetermined estimation of a fall event probability distribution.

This recognizes that there may be some values for the combination of values of the one or more parameters for an event at which the non-fall event probability is low and at which it is unlikely that the event is a fall, according to an estimated fall event probability distribution. Using an estimated fall event distribution to limit the part of the non-fall event probability distribution that is processed to obtain a fall event probability distribution excludes such values, which reduces the number of false alarms detected, that is, the number of non-fall events that are determined to be falls.

The part of the non-fall event probability distribution processed to obtain the fall event probability distribution may comprise the non-fall event probability distribution for values of the combination of the one or more parameters for which the predetermined estimation of a fall event probability exceeds a predetermined minimum value.

The part of the non-fall event probability distribution may comprise the non-fall event probability distribution for values of the combination of the one or more parameters lying between the combination of the one or more parameters having a maximum value in the non-fall event probability distribution and the combination of the one or more parameters having a maximum value in the predetermined estimation of a fall event probability distribution.

The fall event probability distributed may be calculated by computing a likelihood ratio, defined by dividing the predetermined estimation of a fall event probability distribution by the determined non-fall event probability distribution.

In this way, the likelihood ratio test is applied in order to determine the fall event probability distribution. The likelihood ratio test has been shown, by the Neyman-Pearson theorem, to be the most powerful test for determining whether or not an event is a fall for a given false alarm rate.

The most powerful test is the test with the lowest probability of determining a genuine fall event to be a non-fall event.

The threshold value for the fall-event probability distribution may be computed using the non-fall event probability distribution and the fall event probability distribution. In other examples, the threshold value may be set as a predetermined value.

In other examples, the threshold value may be set as the value at which the false alarm rate for the subject, defined as the rate at which non-fall events are determined to be fall events, is equal to a predetermined rate. In this way, the threshold value may be personalized to the subject to ensure that the false alarm rate for that subject is at an acceptable level.

In other examples, the threshold value is a predetermined threshold value, e.g. one that may have been used if a population-based fall event probability distribution were used.

According to examples in accordance with an aspect of the invention, there is provided a computer program comprising code means for implementing the method of any previously described method when said program is run on a processing system.

According to a concept of the invention, there is provided a processing system adapted to: obtain movement data responsive to the subject's movement during everyday activities over a predetermined data collection period; detect one or more events in the movement data; obtain a value for each of one or more parameters from the movement data at the time of the event for each event that occurs during the predetermined data collection period; a non-fall event probability distribution by calculating a probability distribution for a combination of one or more parameters using the obtained values for each of one or more parameters, wherein the combination of the one or more parameters is capable of indicating the probability of a fall; obtain a fall event probability distribution using the non-fall event probability distribution; and obtain a threshold value for the fall event probability distribution that distinguishes between a fall event and a non-fall event.

The processing system may be adapted to obtain the fall event probability distribution by processing the non-fall event probability distribution, such that there is a high fall event probability for values at which the non-fall event probability is low and vice versa.

There is also proposed a system for detecting a fall of a subject, comprising one or more sensors for obtaining movement data responsive to the subject's movement, and the processing system described above, further configured to: receive the movement data from the one or more sensors; detect events in the movement data after the predetermined data collection period has elapsed; and classify each detected event as a fall event or a non-fall event by comparing the fall event probability for the combination of obtained values for the one or more parameters, for the event, with the threshold value.

The processing system may, when the threshold value corresponds to a predetermined false alarm rate, be further configured to determine a false alarm probability, defined as the quotient between the predetermined false alarm rate and a rate at which events are detected for the subject, and the system for detecting a fall of a subject may further comprise a user interface configured to provide a cancel function, which, when activated by the subject, instructs the processing system to re-classify a detected fall event as a non-fall event, wherein the user interface is configured to display the predetermined false alarm rate and/or the false alarm probability, and optionally to receive a user instruction to disable the cancel function, and the user interface is configured to selectively disable the cancel function, after the predetermined data collection period has elapsed, responsive to the value of the determined false alarm probability and/or a user instruction.

Disabling the cancel function when the system is judged to classify events with sufficient accuracy reduces interaction complexity and increases subject safety by preventing the cancel function from being accidentally activated in the case of a real fall event.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
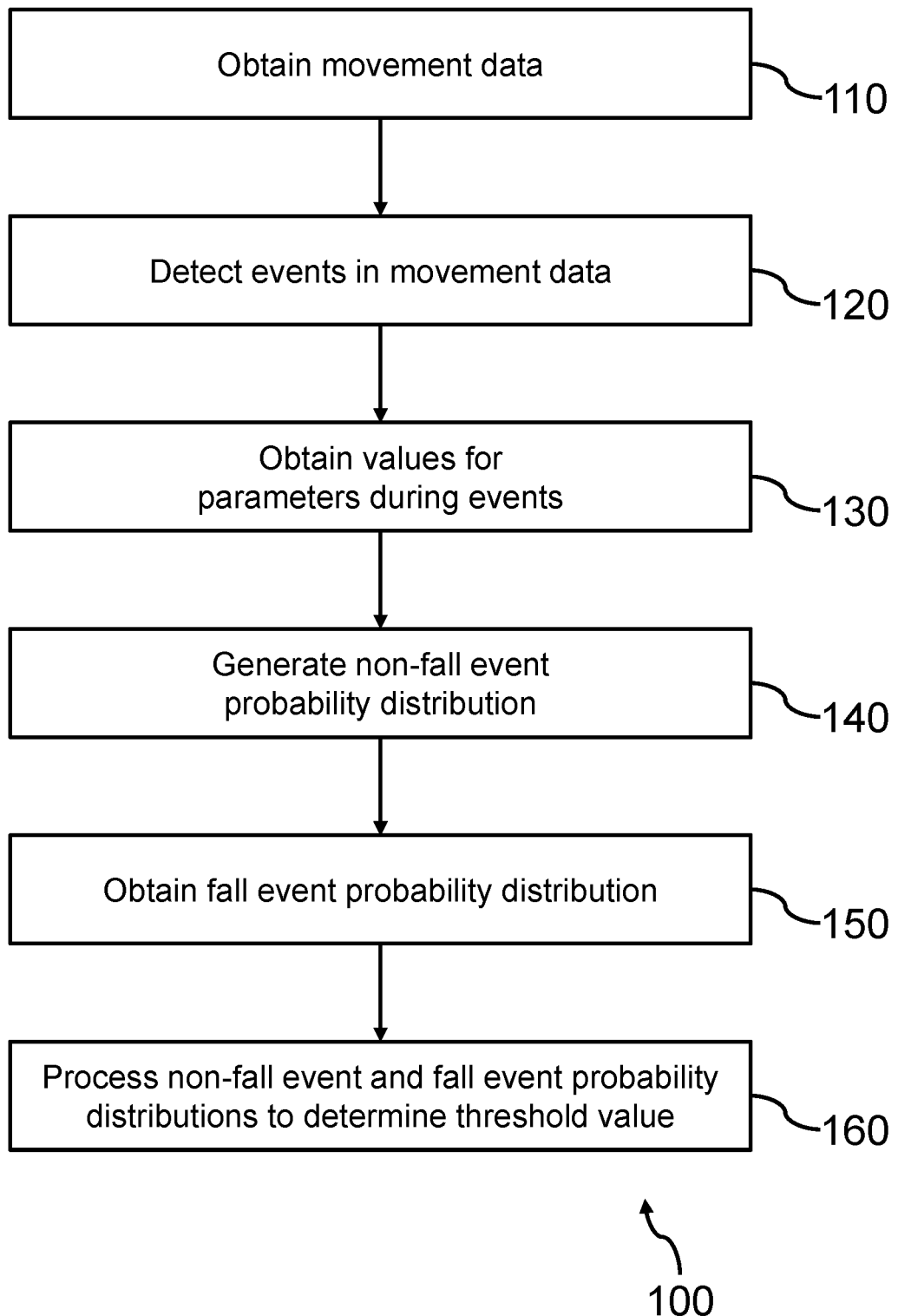
FIG. 1 is a flow diagram of a method of training a classifier to distinguish between a fall event and a non-fall event of a subject, according to an embodiment of the invention.

The invention will be described with reference to the Figures.

It should be understood that the detailed description and specific examples, while indicating exemplary embodiments of the systems and methods, are intended for the purposes of illustration only and are not intended to limit the scope of the invention. These and other features, aspects and advantages of the systems and methods of the present invention will become better understood from the following description, appended claims and accompanying drawings. It should be understood that the same reference numerals are used throughout the Figures to indicate the same or similar parts.

Existing fall detection systems typically consist of two phases. In a first phase, values for parameters that may indicate the likelihood of a fall are obtained for an event from data from sensors such as accelerometers and barometric sensors. Other sensors may include gyroscopes, magnetometers, ultrasound sensors, radar sensors, skin conductivity sensors and pulse (PPG) sensors, for example. The parameters may include any of height, height change, orientation, orientation change, velocity, duration and impact (distance, physiological quantities). Events are typically defined using a trigger, which monitors at least one trigger parameter: an event is considered to have occurred at the point at which the value of a trigger parameter exceeds or falls below a corresponding predetermined trigger threshold value (or when a change of a value is greater than a predetermined change). For example, an event may be detected when the barometer indicates a height drop of more than 50 cm, or the accelerometer indicates an acceleration of more than 2 g.

In a second phase, a classifier (e.g. a processing device) takes one or more of the obtained parameter values from the event and outputs a value indicating or predicting whether or not the event is a fall. In some cases, the obtained parameter value(s) are used by the classifier to calculate a probability that a fall has occurred, e.g. using a fall event probability distribution, and the classifier applies a threshold to the calculated probability to decide whether that probability is predict, with a certain degree of accuracy, whether or not a fall has occurred.

According to a concept of the invention, there is proposed a method and system for training a fall detection classifier using subject-specific movement data. Movement data responsive to a subject's movements during everyday activities are obtained over a predetermined data collection period. For each detected event in the movement data, values for one or more parameters that may (together or individually) indicate a fall are obtained. The obtained values are used to generate a subject-specific probability distribution for non-fall events. A fall event probability distribution is obtained using the non-fall event probability distribution. This fall event probability distribution can then be subsequently processed, with reference to a threshold value, to distinguish fall events from non-fall events.

Embodiments are at least partly based on the realization that different people exhibit different movement behaviors, and that a classifier trained on subject-specific movement data can detect a subject's falls with greater accuracy than a classifier trained using population data.

Illustrative embodiments may, for example, be employed in fall detectors and/or fall detection systems in PERS systems at a subject's home or in specialized accommodation such as Senior Living Facilities, in hospital products, and/or using apps designed for smartwatches.

In any described embodiment, a probability distribution may be a joint probability distribution or a multivariate probability distribution. This can be expressed as a cumulative distribution function or a joint probability density function.

FIG. 1 illustrates a method 100 for training a classifier to distinguish between a fall event and a non-fall event of a subject, according to an embodiment of the invention.

The method 100 begins with step 110, in which movement data responsive to the subject's movement during everyday activities, e.g. activities of daily living (ADL), are obtained over a predetermined data collection period.

The movement data comprises sufficient information for a one or more predefined parameters to be measured from the movement data, wherein each parameter, or a combination of the parameters, is capable of indicating the probability of a fall. Examples of parameters capable of indicating the probability of a fall include height, height change, orientation, orientation change, air pressure change, velocity, acceleration, duration and impact.

The movement data may comprise data from at least one suitable sensor. Examples of suitable sensors include accelerometers, barometric sensors, tilt switches, vibration sensors, gyroscopes, magnetometers, ultrasound sensors, radar sensors, skin conductivity sensors and pulse (photoplethysmography, PPG) sensors. These data are collected as the subject carries out everyday activities, such as standing up, sitting down, lying down, bending over, walking and climbing stairs. For wrist-located devices, the movements also include the many motions related to activities such as pointing, waving, gesturing (during conversations), (car) driving, washing dishes, doing laundry, and (vacuum) cleaning.

The predetermined data collection period may be a week, one or a few days, a month or some other suitable length of time. An initial short data collection period, for example, a day, may be used to obtain some movement data, then data may continue to be collected over a longer data collection period to refine the results.

The predetermined data collection period may also be the length of time taken to detect a predetermined number of events, or the data collection period may be defined by both a minimum number of events and a minimum duration. Thus, in some examples, the predetermined data collection period may be defined as a period during which a predetermined number of events (described below) are detected. Other definitions are also conceivable, including user controlled methods.

The subject's movement data may be kept up-to-date, ensuring that fall events continue to be accurately distinguished from non-fall events even if the subject's typical movement behaviors change over time, by repeating the method 100 at regular intervals, or by continually collecting movement data and using data from a moving window, for example, data from the last week, in the remaining steps of the method 100.

At step 120, the method comprises detecting one or more events in the movement data. An event may be defined by setting at least one of the predefined parameter(s), or a combination of parameters, as a trigger parameter and defining an event as occurring at a time at which a value of the at least one trigger parameter exceeds or falls below a corresponding predetermined trigger threshold value. The used parameter(s) is (are) usable again in the next steps, but this is not essential.

The at least one parameter to be set as a trigger parameter may be predefined. The at least one parameter may be a parameter that research shows may be configured to detect all, or almost all, fall events while detecting a minimal number of non-fall events. The at least one trigger parameter may be selected based on the computational complexity required to obtain a value of the trigger parameter. Examples of trigger parameters may include air pressure change and acceleration size.

A suitable trigger threshold may be determined from literature, or from simulations of falls, and may be set to be a value for which all, or almost all, fall events will pass. For example, an event may be detected when the barometer indicates a height drop of more than 50 cm, or the accelerometer indicates an acceleration of more than 2 g.

Other methods of detecting events, such as the use of a machine learning algorithm to directly process chunks of movement data, will be apparent to the skilled person.

At step 130, the method comprises obtaining a value for each of one or more parameters at the time of the event for each event that occurs during the predetermined data collection period. The one or more parameters preferably comprises a plurality of parameters. This data may be labelled "event information".

In some examples, values are obtained for all of the predefined parameters; in other examples, a selection process may be used to select a subset of a plurality of predefined parameters that yields best accuracy for the subject. Examples of methods for selecting parameters will be apparent to the skilled person, known in the art as "feature selection", and may include forward search, backwards search and LASSO.

At step 140, the method comprises generating a non-fall event probability distribution ($P_{ADL}$) by calculating a probability distribution for a combination of the one or more parameters using the event information, i.e. using the obtained values for each of the one or more parameters from all the events that occur during the predetermined data collection period.

This probability distribution may be calculated by determining a probability distribution for each of the one or more parameters, and defining the calculated probability distribution for the combination of the one or more parameters as the product of the determined probability distributions.

The log of the probability distribution for the combination of the one or more parameters may therefore be found by calculating the sum of the logs of the determined probability distributions.

Extreme values, due to, for example, the probability distribution for a parameter being close to zero, may be clipped.

In other examples, the non-fall event probability distribution may be calculated by first combining two or more parameters (e.g. into subsets of parameters), before calculating the non-fall event probability distribution for the combination.

The non-fall event probability distribution may be multivariate, i.e. form a joint probability distribution.

The probability distribution of a single parameter may be found by curve-fitting to the collected set of values of that parameter and normalizing the curve's integral to unit size. In some examples, all collected values for a parameter may be used to generate the probability distribution for the parameter, operating under the assumption that the number of falls that occur during the predetermined data collection period will be low enough not to significantly affect the calculated probability distribution. In other examples, outliers may be removed before the curve-fitting, by, for example, excluding values from events that have a high probability of being fall events, according to some predetermined estimation of a fall event probability, and/or values from events that are defined as fall events based on subject input.

Since the non-fall event probability distribution is generated from subject-specific movement data rather than a population average, it may be used to distinguish between fall events and non-fall events with greater accuracy.

In some embodiments, a plurality of non-fall event probability distributions (for different combinations of one or more parameters) may be generated from the movement data. The plurality of non-fall probability distributions may be employed in subsequent steps in place of a single non-fall probability distribution.

At step 150, a fall event probability distribution ($P_D$) for the combination of the one or more parameters is obtained (i.e. those parameters contained in the event information) using the non-fall event probability distribution.

Since the number of falls during the predetermined data collection period may be low, a fall event probability distribution cannot be reliably obtained using or incorporating real, subject-specific fall data during the data collection period. That being said, in some examples, real subject-specific data from any falls that are detected after the predetermined data collection period is complete may be used to further refine the fall event probability distribution.

In preferred examples, the fall event probability distribution is calculated by processing the non-fall event probability distribution. This process may follow the approach of anomaly detection, in which events outside the non-fall event probability distribution (anomalies) are classified as fall events.

A first example method of obtaining the fall event probability distribution may comprise computing a likelihood ratio. This process may comprise dividing a predetermined estimation of a fall event probability distribution by the non-fall event probability distribution generated from the subject's movement data. The likelihood ratio may then be normalized to formulate a probability distribution. Of course, in some examples, the likelihood ratio may itself act as a probability distribution (albeit Another example method of obtaining a fall event probability distribution comprises processing the non-fall event probability distribution such that there is a high fall event probability for values at which the non-fall event probability is low and vice versa. A high probability may be considered to be a probability above 0.5, where the probability is on a scale of 0 to 1, while a low probability may be considered to be a probability below 0.5. These are purely exemplary values, and the skilled person might consider other threshold values for determining whether a probability is "high" and "low".

There are a number of ways in which the fall event probability distribution may be defined in terms of the non-fall probability distribution such that there is a high fall event probability for values at which the non-fall event probability is low and vice versa. For example, the fall event probability distribution may be defined as the inverse/reciprocal of the non-fall event probability distribution, the probability complement of the non-fall event probability distribution (calculated by performed 1–the non-fall event probability distribution), or the probability complement of the non-fall event probability distribution divided by the non-fall event probability distribution.

In other examples, the fall event probability distribution is obtained by selecting a predetermined fall event probability distribution (e.g. from a number of options) based upon the non-fall event probability distribution. This may comprise, for example, consulting a database correlating predetermined fall event probability distributions to predetermined non-fall event probability distributions, and selecting the fall event probability distribution that corresponds to a predetermined estimation of a probability distribution that most closely matches (e.g. calculated using a cross-correlation technique or the like) the generated non-fall event probability distribution.

Other methods of obtaining a fall event probability distribution using a generated non-fall event probability distribution will be apparent to the skilled person, the selection of which depends upon preferred implementation details. Further examples are given in FIGS. 2 to 5.

Figure 2:
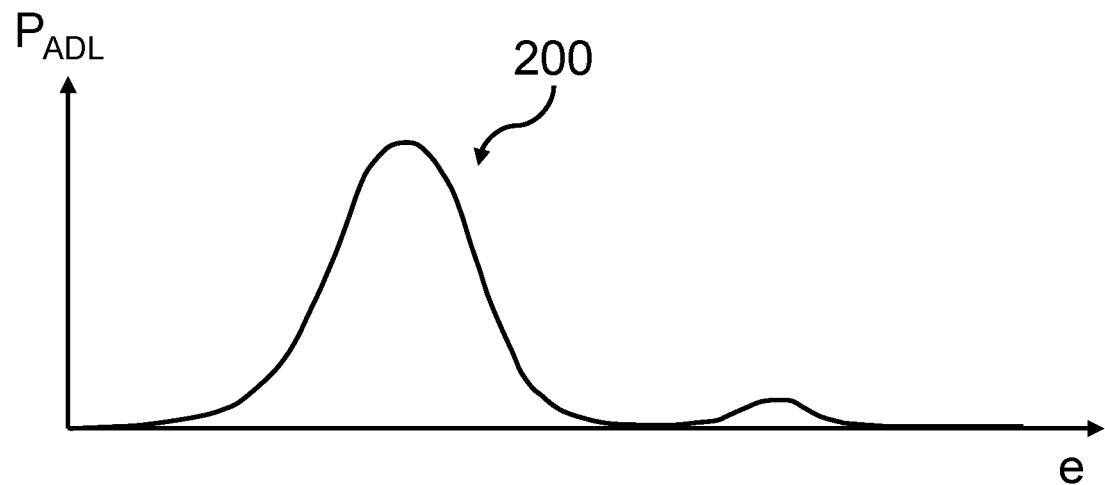
FIG. 2 is a graph showing an example of a non-fall event probability distribution.

FIG. 2 illustrates an example non-fall event probability distribution 200, also labelled $P_{ADL}$, generated from a subject's movement data over the predetermined data collection period, as described in step 140 of method 100.

Figure 3:
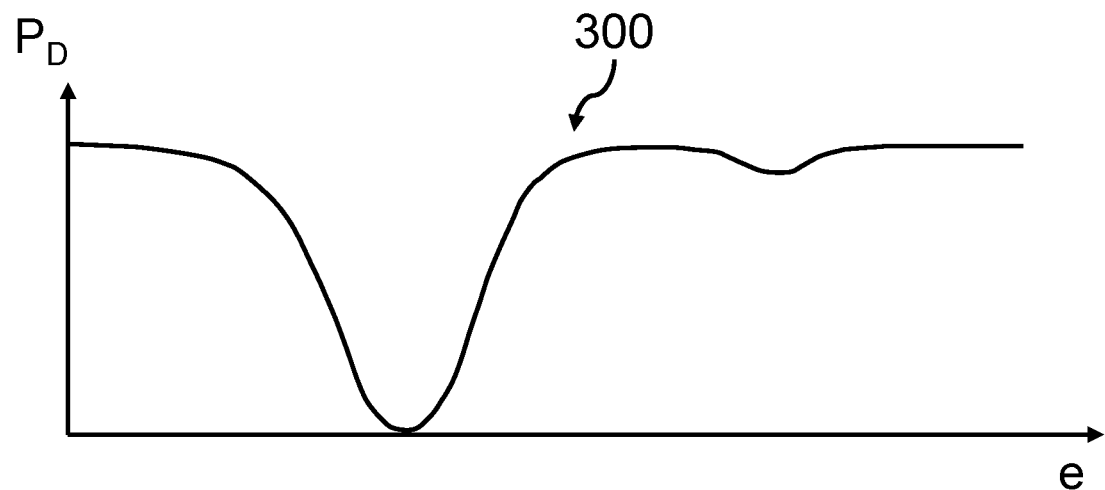
FIG. 3 is a graph showing an example of a fall event probability distribution generated using a method according to an embodiment of the invention.

FIG. 3 illustrates an example fall event probability distribution 300, also labelled $P_D$, obtained by taking the complement of the non-fall event probability distribution 200. The fall event probability distribution 300 has a high probability where the non-fall event probability distribution 200 has a low probability, and a low probability where the non-fall event probability distribution 200 has a high probability.

The accuracy of a fall event probability distribution obtained by processing a non-fall event probability distribution may be improved by recognizing that there are some values for which the non-fall event probability is low that are unlikely to correspond to fall events.

Figure 4:
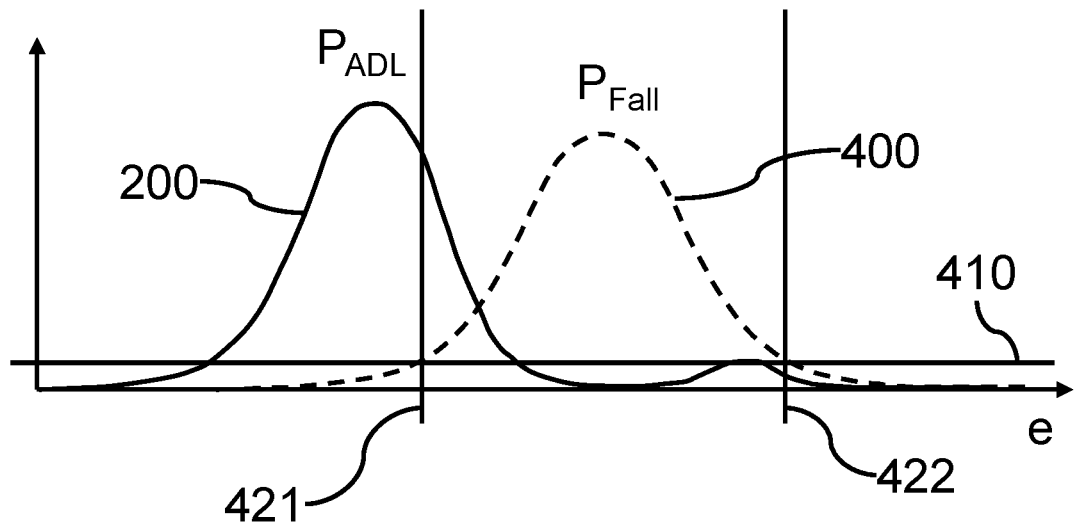
FIG. 4 is a graph showing an example of a non-fall event probability distribution and an example of a predetermined estimation of a fall event probability distribution.

FIG. 4 illustrates the example non-fall event probability distribution 200, also labelled $P_{ADL}$, alongside an example of a predetermined estimation of a fall event probability distribution 400, also labelled $P_{FALL}$. The predetermined estimation 400 may be generated using simulated fall data, or by some other method, such as from literature or historic measurements. The predetermined estimation may be obtained, for example, from a database, storage or other memory module.

As can be seen from FIG. 4, both the non-fall event probability distribution 200 $P_{ADL}$ and the predetermined estimation of a fall event probability distribution 400, $P_{FALL}$ have a low probability at very low and very high values of the combination of the one or more parameters (plotted along the x-axis). Referring back to FIG. 3, the fall event probability distribution 300, obtained by reverting (i.e. computing the complement) the non-fall event probability distribution 200, has a high probability at these values.

In an embodiment, only part of the non-fall event probability distribution is processed to obtain the fall event probability distribution, in order to exclude parts of the non-fall event probability distribution where a predetermined estimation of a fall event probability distribution has a low probability. Which part of the non-fall event probability distribution is processed is determined using the predetermined estimation of a fall event probability distribution.

FIG. 4 shows an example of how the part of the non-fall event probability distribution to be processed may be determined. In this example, a minimum value 410 for the predetermined estimation of a fall event probability distribution 400 is chosen. The minimum value 410 may be a percentage of the maximum probability of the predetermined estimation of a fall event probability distribution, or may be a predetermined value. The non-fall event probability distribution 200 is only processed for values of the combination of the one or more parameters for which the predetermined estimation of a fall event probability exceeds the minimum value 410.

In FIG. 4, the part of the non-fall event probability distribution 200 that is processed is the part between the boundaries 421 and 422. There are two boundaries 421 and 422 in FIG. 4, but more complex probability distribution in which more boundaries are required may be used.

Figure 5:
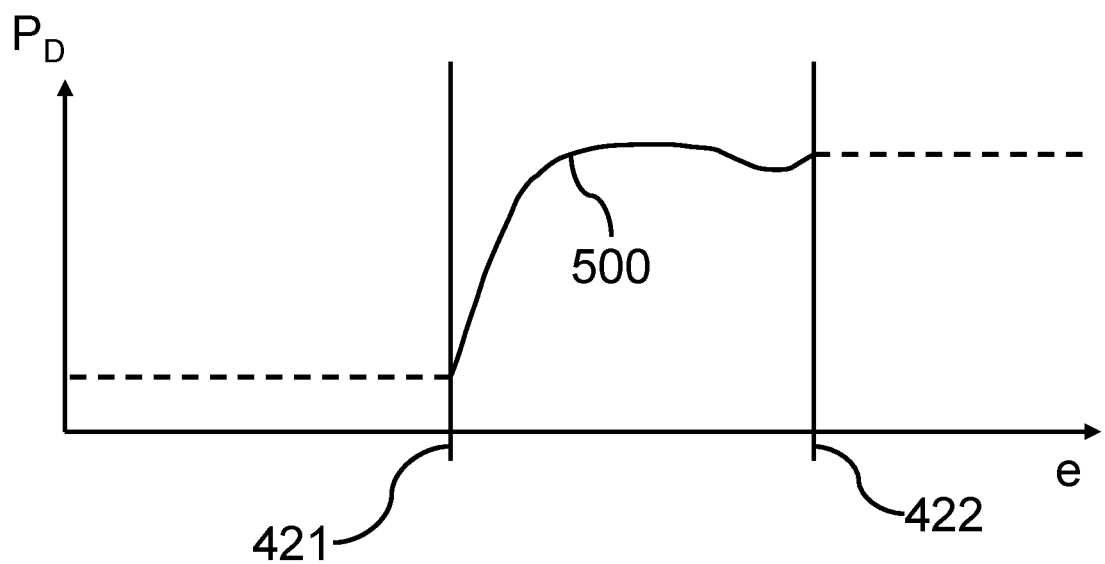
FIG. 5 is a graph showing another example of a fall event probability distribution generated using a method according to an embodiment of the invention.

FIG. 5 illustrates an example of a fall event probability distribution 500 that may be obtained using this method. Between the boundaries 421 and 422, the fall event probability distribution 500 is obtained by taking the compliment of the part of the non-fall event probability distribution 200 that lies between the boundaries 421 and 422.

The part of the fall event probability distribution 500 to the left of (lower) boundary 421 (i.e. having a lower value than the boundary 421) may be set as a constant equal to the fall event probability at boundary 421, or may be given some predetermined value. A suitable predetermined value may be the minimum value 410 used to determine which part of the non-fall event probability distribution is processed, although other values are contemplated.

Similarly, the part of the fall event probability distribution 500 to the right of (upper) boundary 422 (i.e. having a higher value than the boundary 422) may be set as a constant equal to the fall event probability at boundary 422, or given some predetermined value.

To save memory space, the fall event probability distribution may be simply stored as values between the lower 421 and upper 422 boundaries. During later processing, if an (x-axis) value lower than the lower boundary 421 is used, the corresponding probability may be clipped to the value at the lower boundary. Similarly, if an (x-axis) value higher than the upper boundary is used, the corresponding probability may be clipped to the value at the upper boundary 422.

Other methods to generate the part of the fall event probability distribution that is outside the boundaries of 421, 422 (i.e. define the probability values outside of the boundaries 421, 422) may be used. For example, the part of the predetermined estimation of a fall event probability distribution 400 outside the boundaries 421 and 422 may be used as the part of the fall event probability distribution outside the boundaries 421 and 422.

Other methods may be used to determine which part of the non-fall event probability distribution is processed. For example, the part of the non-fall event probability distribution may comprise the part of the non-fall event probability distribution for values of the combination of the one or more parameters lying between the combination of the one or more parameters having a maximum value in the non-fall event probability distribution and the combination of the one or more parameters having a maximum value in the predetermined estimation of a fall event probability distribution.

In embodiments in which a plurality of non-fall event probability distributions are generated in step 140, any previously described method of generating a fall event probability distribution could be applied to each of the plurality of non-fall event probability distributions (thereby generating intermediate fall event probability distributions, one for each non-fall event probability distribution). The intermediate fall event probability distributions may be combined, e.g. by calculating the product or summing logs, in order to generate the (overall) fall event probability distribution.

Whilst presently illustrated using only two dimensions for the sake of improved clarity, in some embodiments, the non-fall event probability distribution and/or fall event probability distribution may be a joint probability density function, i.e. a multivariate probability distribution. This can be formatted using a plurality of two-dimensional probability distributions (e.g. for each parameter or sub-combination of parameters).

Different dimensions of the joint probability dimension function may therefore represent a different variable from the movement data. Dimensions of the multi-dimensional probability distribution may then be processed independently to generate a corresponding dimension for the fall-event probability distribution (e.g. by performing any previously described method for generating a fall-event probability distribution). In other words, each of a plurality of two-dimensional probability distributions forming the non-fall event probability distribution may be individually processed using a previously described method (e.g. inverting or the like) to generate a two-dimensional probability distribution for the fall event probability distribution. This forms a multivariate probability distribution for the fall event probability distribution.

The two-dimensional probability distributions could be combined, e.g. using a product or summing logs, to generate a two-dimensional fall event probability distribution. Alternatively, the fall event probability distribution may be maintained as a joint probability density function.

Referring back to FIG. 1, at step 160, the method comprises obtaining a threshold value, for the fall event probability distribution, that distinguishes between a fall event and a non-fall event.

Step 160 may comprise processing the non-fall event probability distribution and the fall event probability distribution in order to calculate the threshold value. This processing is performed using one or more computer-based algorithmic processes, examples of which are now provided.

In some example, the threshold value may be chosen such that the classifier has a particular false alarm rate. This approach is particularly suited when the fall event probability distribution is calculated using a likelihood ratio. This method for determining the threshold value recognizes that classifiers based on the likelihood ratio test provide optimal detection accuracy, according to the Neyman-Pearson theorem. For a given false alarm rate, the likelihood ratio test provides the lowest probability of incorrectly classifying a fall event as a non-fall event.

In some embodiments, the threshold value may be personalized by setting it at the fall event probability at which the false alarm rate for the subject is equal to a predetermined rate FA_set. The threshold value may be determined from the subject-specific non-fall event probability distribution, by using the fact that the integral of the non-fall event probability distribution over the region where the fall probability is above the threshold value equals the predetermined false alarm probability. This false alarm probability can be determined as the quotient between the predetermined false alarm rate FA_set and a trigger rate, where the trigger rate is defined as the number of detected events per unit time for the subject.

In some embodiments, only part of the non-fall event probability distribution is used in the calculation to determine the threshold value corresponding to a predetermined false alarm rate. This part may be determined using any of the previously described methods. In this way, a threshold value set by integrating the non-fall event probability distribution may yield comparable detection accuracy to a threshold value determined from the likelihood ratio test.

Other embodiments may comprise obtaining a predetermined threshold value, e.g. a standard threshold value used in the art.

Figure 6:
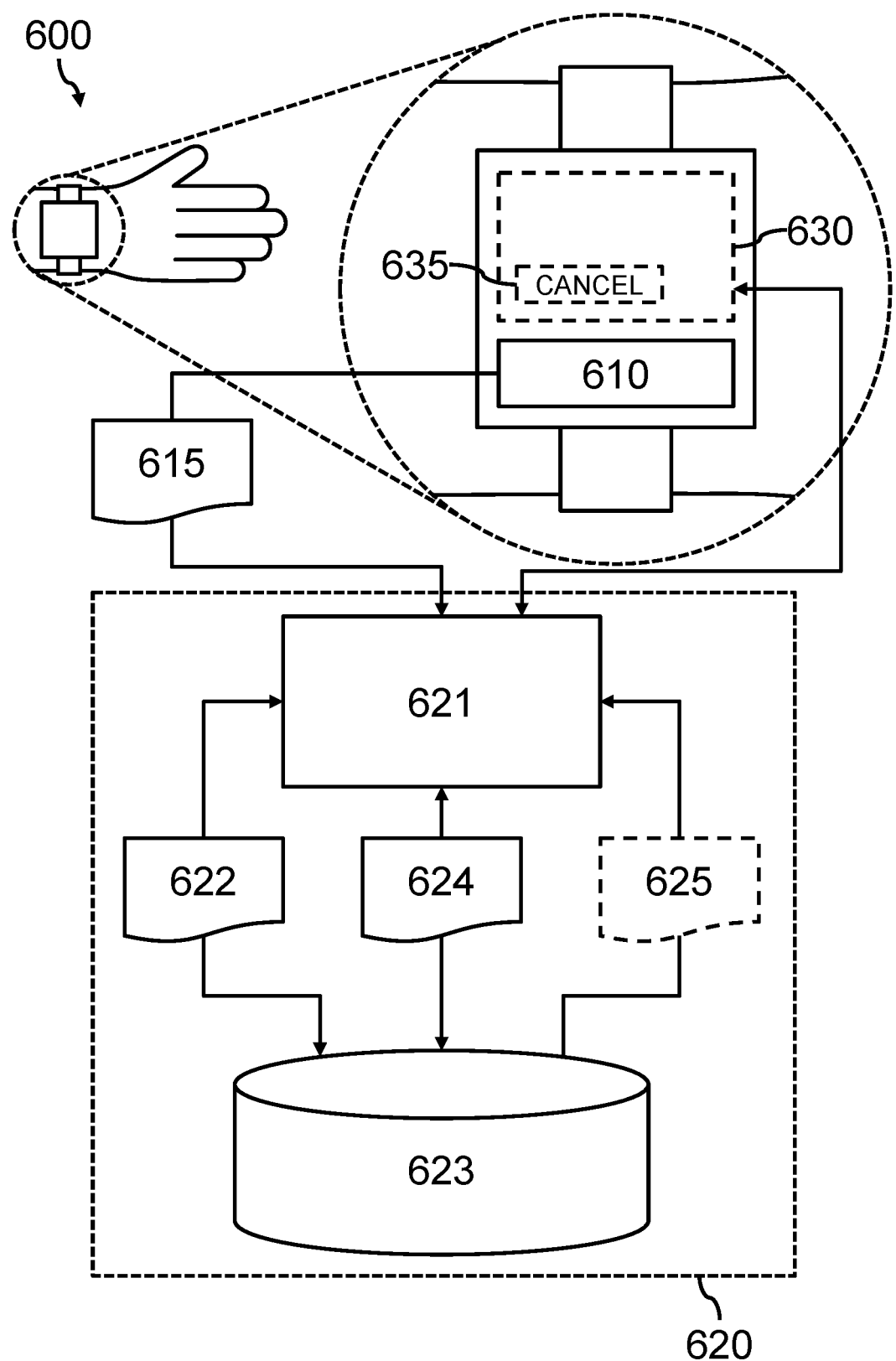
FIG. 6 is a diagram of a system for detecting a fall of a subject according to the invention.

FIG. 6 illustrates a fall detection system 600 for detecting a fall of a subject, comprising one or more sensors 610 and a processing system 620, according to an embodiment of the invention. The processing system 620 is, itself, an embodiment of the invention.

The one or more sensors 610 are configured to obtain movement data 615 responsive to the subject's movement. The one or more sensors may include at least one of an accelerometer, a barometric sensor, a tilt switch, a vibration sensor and a gyroscope. The one or more sensors may be part of a wearable device, for example, a smartwatch or a pendant worn around the neck.

The processing system 620 comprises one or more processors 621 adapted to receive movement data 615 from the one or more sensors 610, and to detect events that occur in the movement data 615. An event may be detected when a defined trigger parameter (which may be a combination of parameters of the movement data) changes by more than a predetermined amount or when a value of the trigger parameter breaches a predetermined threshold, as previously described. Other methods would be apparent to the skilled person.

Event information 622 from events that occur during a predetermined data collection period is stored in a memory 623. This event information comprises the values of a one or more parameters that may (together or individually) indicate the probability of a fall at the time of the event for each detected event, such as height, height change, orientation, orientation change, air pressure change, velocity, acceleration, duration and impact.

At the end of the predetermined data collection period, the one or more processors 621 obtain the event information 622 from the memory 623, and generate a non-fall event probability distribution by calculating a probability distribution from the event information. In particular, a non-fall event probability distribution is calculated for a combination of the one or more parameters for which values are provided in the event information. Preferably, the one or more parameters comprises a plurality of parameters.

The one or more processors 621 obtain a fall event probability distribution for the combination of the one or more parameters using the non-fall event probability distribution.

The one or more processors 621 also obtain a threshold value for the fall event probability distribution. This threshold value can be used to distinguish between fall events and non-fall events. The threshold value may be stored in the memory 623.

In some examples, the one or more processors are adapted to process the non-fall event probability distribution and the fall event probability distribution to determine a threshold value 624 for the fall event probability distribution, such that the threshold value 624 may be used to distinguish between fall events and non-fall events. The non-fall event probability distribution and the fall event probability distribution may, for example, be processed using any of the described methods. The determined threshold value 624 is stored in the memory 623.

The memory 623 may store a predetermined estimation of a fall event probability distribution 625 which may be used by the one or more processors 621 when determining the threshold value 624 and/or the fall event probability distribution.

For events that are detected after the predetermined data collection period has elapsed, the one or more processors 621 may compare the fall event probability for the value of the combination of the one or more parameters with the threshold value 624 and classify the event as a fall event or a non-fall event on the basis of this comparison.

The fall detection system 600 may also comprise a user interface 630 configured to provide a cancel function 635. The cancel function 635 may be configured to re-classify a detected fall event as a non-fall event when activated by the subject.

In some embodiments, the threshold value 624 corresponds to a predetermined false alarm rate. A false alarm probability can be determined as the quotient between the predetermined false alarm rate and a trigger rate, where the trigger rate is defined as the number of detected events per unit time for the subject. The false alarm rate and/or the false alarm probability may be sent to the user interface 630 to inform the subject of the accuracy of the system.

In some embodiments, the user interface 630 is configured to receive a user instruction to disable the cancel function, should the subject consider the system to be accurate enough that a cancel function is not required. In other embodiments, the processing system 620 may automatically disable the cancel function if the determined false alarm probability is below a predetermined value, for example, 0.001 or 0.00001.

It will be understood that the disclosed methods are computer-implemented methods. As such, there is also proposed a concept of a computer program comprising code means for implementing any described method when said program is run on a processing system.

The skilled person would be readily capable of developing a processor for carrying out any herein described method. Thus, each step of a flow chart may represent a different action performed by a processor, and may be performed by a respective module of the processing processor.

As discussed above, the system makes use of a processor to perform the data processing. The processor can be implemented in numerous ways, with software and/or hardware, to perform the various functions required. The processor typically employs one or more microprocessors that may be programmed using software (e.g. microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted that the term "adapted to" is intended to be equivalent to the term "configured to". Any reference signs in the claims should not be construed as limiting the scope.

The invention claimed is:

1. A computer-based method of training a classifier to distinguish between a fall event and a non-fall event of a subject, the computer-based method comprising:
   obtaining movement data responsive to a subject's movement during everyday activities over a predetermined data collection period;
   detecting one or more events in the movement data;

obtaining a value for each of a one or more parameters from the movement data at a respective time of the event for each event that occurs during the predetermined data collection period;

generating a non-fall event probability distribution indicating a probability of a non-fall event by calculating a probability distribution for a combination of the one or more parameters using the obtained values for each of the one or more parameters, wherein the combination of the one or more parameters is capable of indicating the probability of the non-fall event;

obtaining a fall event probability distribution using the non-fall event probability distribution;

obtaining a threshold value for the fall event probability distribution that distinguishes between a fall event and the non-fall event; and configuring an automatic fall detector with the threshold value, the automatic fall detector configured to use the threshold value for distinguishing between a fall event and a non-fall event for additionally obtained movement data responsive to additional movements of the subject.

2. The computer-based method of claim 1, wherein the calculated probability distribution for the combination of the one or more parameters is calculated by:

determining a probability distribution for each of the one or more parameters; and defining the calculated probability distribution for the combination of the one or more parameters as the product of the determined probability distributions.

3. The computer-based method of claim 1, wherein the step of obtaining the fall event probability distribution comprises processing the non-fall event probability distribution, such that there is a high fall event probability for values at which the non-fall event probability is low and vice versa.

4. The computer-based method of claim 1, wherein the step of obtaining the fall event probability distribution comprises calculating the inverse or complement of the non-fall event probability distribution.

5. The computer-based method of claim 1, wherein the step of obtaining the fall event probability distribution comprises dividing a predetermined estimation of a fall event probability distribution by the non-fall event probability distribution.

6. The computer-based method of claim 1, wherein the step of obtaining the fall event probability distribution comprises processing only part of the non-fall event probability distribution, which part of the non-fall probability distribution to be processed being determined using a predetermined estimation of a fall event probability distribution.

7. The computer-based method of claim 6, wherein the part of the non-fall event probability distribution comprises the non-fall event probability distribution for values of the combination of the one or more parameters for which the predetermined estimation of a fall event probability exceeds a predetermined minimum value.

8. The computer-based method of claim 6, wherein the part of the non-fall event probability distribution comprises the non-fall event probability distribution for values of the combination of the one or more parameters lying between the combination of the one or more parameters having a maximum value in the non-fall event probability distribution and the combination of the one or more parameters having a maximum value in the predetermined estimation of a fall event probability distribution.

9. The computer-based method of claim 1, wherein the step of obtaining a threshold value for the fall event probability distribution comprises processing the non-fall event probability distribution and the fall event probability distribution to determine the threshold value.

10. The computer-based method of claim 9, wherein the threshold value is set as the value at which a false alarm rate for the subject, defined as the rate at which non-fall events are determined to be fall events, is equal to a predetermined rate.

11. A non-transitory storage medium storing one or more computer programs that, when executed on one or more processors, cause the one or more processors to perform the method of claim 1.

12. A processing system adapted to:

obtain movement data responsive to the subject's movement during everyday activities over a predetermined data collection period;

detect one or more events in the movement data;

obtain a value for each of one or more parameters from the movement data at the time of the event for each event that occurs during the predetermined data collection period;

generate a non-fall event probability distribution indicating a probability of a non-fall event by calculating a probability distribution for a combination of the one or more parameters using the obtained values for each of one or more parameters, wherein the combination of the one or more parameters is capable of indicating the probability of the non-fall event;

obtain a fall event probability distribution using the non-fall event probability distribution;

obtain a threshold value for the fall event probability distribution that distinguishes between a fall event and the non-fall event; and configure an automatic fall detector with the threshold value, the automatic fall detector configured to use the threshold value for distinguishing between a fall event and a non-fall event for additionally obtained movement data responsive to additional movements of the subject.

13. The processing system of claim 12, where the processing system is adapted to obtain the fall event probability distribution by processing the non-fall event probability distribution, such that there is a high fall event probability for values at which the non-fall event probability is low and vice versa.

14. A system for detecting a fall of a subject, the system comprising:

one or more sensors for obtaining movement data responsive to the subject's movement; and the processing system of claim 12, further configured to:
receive the movement data from the one or more sensors;
detect events in the movement data after the predetermined data collection period has elapsed; and
classify each detected event as a fall event or a non-fall event by comparing the fall event probability for a combination of obtained values, for the event, with the threshold value.

15. The system of claim 14, wherein the threshold value is configured to correspond to a predetermined false alarm rate, wherein the processing system is configured to determine a false alarm probability using the movement data, and wherein the system further comprises:

a user interface configured to provide a cancel function, which, when activated by the subject, instructs the processing system to re-classify a detected fall event as a non-fall event, wherein:
the user interface is configured to display the predetermined false alarm rate and/or the false alarm probability, and optionally to receive a user instruction to disable the cancel function; and
the user interface is configured to selectively disable the cancel function, after the predetermined data collection period has elapsed, responsive to the value of the determined false alarm probability and/or a user instruction.

* * * * *